US011354636B2

(12) United States Patent
Wang

(10) Patent No.: US 11,354,636 B2
(45) Date of Patent: Jun. 7, 2022

(54) TRANSACTION BUNDLES FOR INTERNET OF THINGS DEVICES

(71) Applicant: Hewlett Packard Enterprise Development LP, Houston, TX (US)

(72) Inventor: Santino Wang, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 364 days.

(21) Appl. No.: 16/246,725

(22) Filed: Jan. 14, 2019

(65) Prior Publication Data

US 2020/0226566 A1 Jul. 16, 2020

(51) Int. Cl.
*G06Q 20/16* (2012.01)
*G06Q 20/08* (2012.01)
*H04L 9/32* (2006.01)
*H04L 67/12* (2022.01)
*G06Q 20/38* (2012.01)

(52) U.S. Cl.
CPC ......... *G06Q 20/16* (2013.01); *G06Q 20/3825* (2013.01); *H04L 9/3247* (2013.01); *H04L 67/12* (2013.01)

(58) Field of Classification Search
None
See application file for complete search history.

(56) References Cited

U.S. PATENT DOCUMENTS

| 8,881,977 | B1 * | 11/2014 | Paczkowski | G06Q 20/322 |
| | | | | 235/379 |
| 10,924,466 | B2 * | 2/2021 | Biyani | H04L 9/3247 |

| 2003/0182549 | A1 * | 9/2003 | Hallin | H04L 63/0823 |
| | | | | 713/156 |
| 2013/0124346 | A1 * | 5/2013 | Baldwin | G06Q 20/353 |
| | | | | 705/16 |
| 2014/0019340 | A1 * | 1/2014 | Ruder | G06Q 20/4016 |
| | | | | 705/39 |

(Continued)

FOREIGN PATENT DOCUMENTS

WO WO-2018007828 1/2018

OTHER PUBLICATIONS

Louie Lu; "In-depth explanation of how IOTA making a transaction (with picture);" Jan. 11, 2018; https://medium.com/@louielu/in-depth-explanation-of-how-iota-making-a-transaction-with-picture-8a638805f905 (Year: 2018).*

(Continued)

*Primary Examiner* — Namrata Boveja
*Assistant Examiner* — William D Newlon
(74) *Attorney, Agent, or Firm* — Brooks, Cameron & Huebsch, PLLC

(57) ABSTRACT

An example controller, comprising a processing resource and a memory resource having instructions stored thereon that when executed by the processing resource cause the processing resource to create a meta transaction including information about a payment from an Internet of Things (IoT) device, receive information from the IoT device about the payment via an output transaction, an input transaction, and an unspent transaction, generate a transaction bundle including the output transaction, the input transaction, the un-spent transaction, and the meta transaction; receive a signature from the IoT device corresponding to the transaction bundle; and verify the signature from the IoT device.

17 Claims, 5 Drawing Sheets

(56) References Cited

U.S. PATENT DOCUMENTS

| | | | |
|---|---|---|---|
| 2018/0005186 A1 | 1/2018 | Hunn | |
| 2018/0247376 A1 | 8/2018 | Sharma et al. | |
| 2018/0322489 A1* | 11/2018 | Altenhofen | G06Q 20/065 |
| 2020/0042958 A1* | 2/2020 | Soundararajan | G06Q 20/06 |
| 2020/0052880 A1* | 2/2020 | Bathen | H04L 9/0833 |
| 2020/0202324 A1* | 6/2020 | Sarin | G06Q 20/3829 |

OTHER PUBLICATIONS

IOTA Proxy, (Web Page), Retrieved Sep. 20, 2018, 2 Pgs., https://github.com/TimSamshuijzen/iotaproxy.

Millenaar, D., Iota: Improving Your Confirmation Rate, (Web Page), Jun. 11, 2018, 7 Pgs., https://vxcompany.com/2018/06/11/iota-improving-your-confirmation-rate.

Relaunching the PoWbox!, (Web Page), Retrieved Sep. 20, 2018, 3 Pgs., https://iotafeed.com/index.php/2018/03/01/relaunching-the-powbox.

\* cited by examiner

TRANSACTION BUNDLES FOR INTERNET OF THINGS DEVICES

BACKGROUND

Internet of Things (IoT) devices are devices that have connectivity functionality. IoT devices may connect to computing devices and other IoT devices to transmit and receive data. IoT devices may participate in transactions of data.

DETAILED DESCRIPTION

Figure 1:
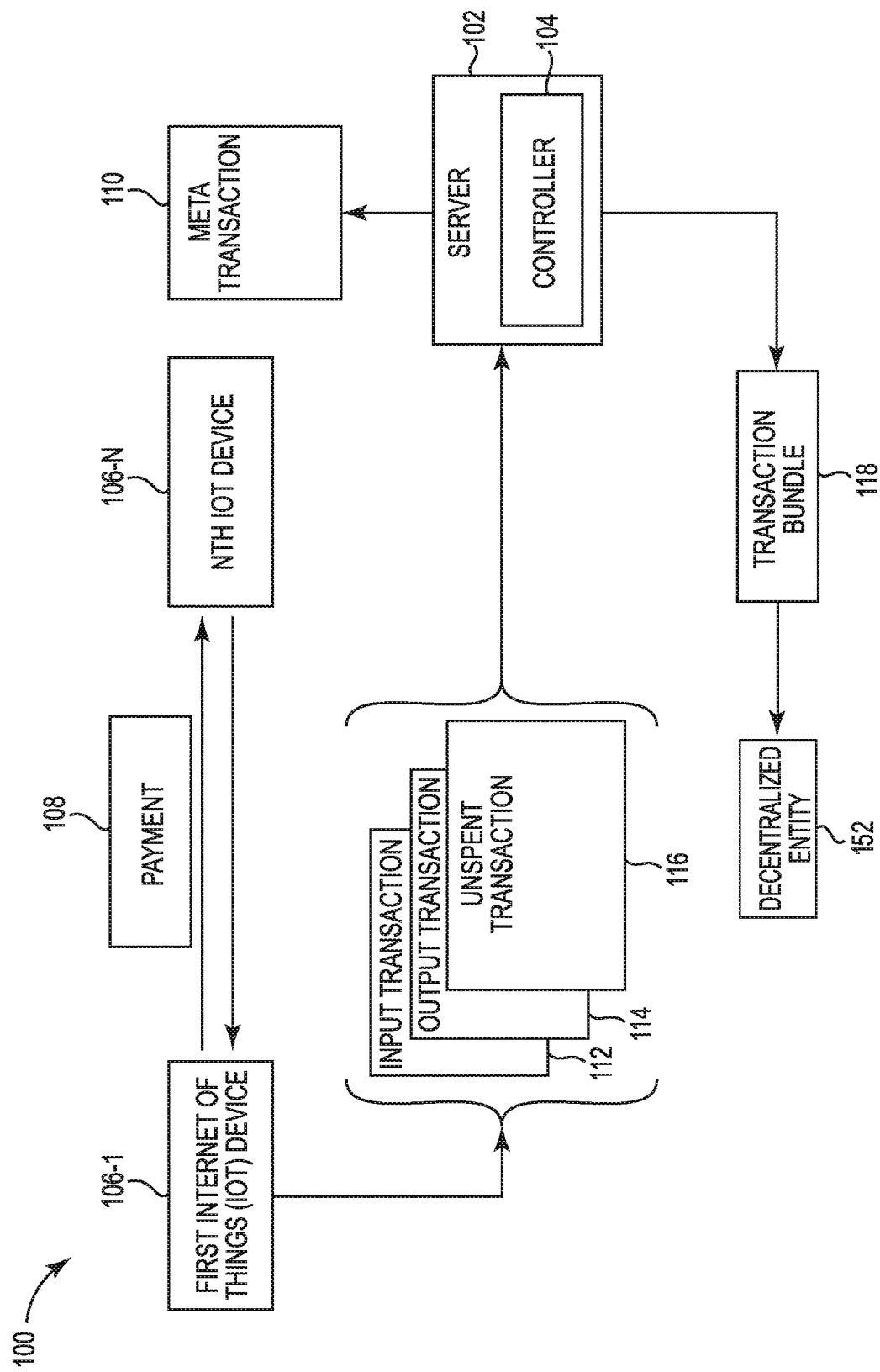
FIG. 1 illustrates an example system including a server to generate transaction bundles for IoT devices consistent with the disclosure.

Internet of Things (IoT) devices may exchange information such as data transactions, and/or payment transactions between other devices such as computing devices and/or other IoT devices. The transactions between devices and/or IoT devices may utilize currency (e.g., digital currency) to participate in transactions. Entities such as users, owners, and/or operators, of the IoT devices may have digital repositories (e.g., digital wallets) to operate as a repository for the data and/or currency exchanged by the IoT devices. IoT devices are becoming increasingly prevalent and serving various purposes such as a mechanism for payment transactions.

Computing devices such as servers may exist in an environment which may include multiple IoT devices which may transmit and receive data and/or payment of information within the environment. As used herein, a "device" refers to an article that is adapted for a particular purpose and/or multiple purposes. Some examples of devices are sensors, personal computers, laptops, tablets, phablets, smartphones, Internet-of-Things (IoT) enabled devices, etc., which may be included on a virtualized architecture and/or a non-virtualized architecture. As used herein, "IoT devices" include devices embedded with electronics, software, sensors, actuators, and/or network connectivity which enable such devices to connect to a network and/or exchange data. Examples of IoT enabled devices include sensors, vehicles, home appliances, smart home devices, monitoring devices, wearable devices, devices enabling intelligent shopping systems, manufacturing devices, among other cyber-physical systems.

As IoT payments become prevalent, the demand for efficient operation, energy efficiency, and security, may increase. IoT payments may include various digital currencies such as Ethereum, Bitcoin, and/or IOTA. For example, IOTA is an emerging digital currency which may be utilized in IoT payments for multiple reasons. For example, IOTA it is a smaller denomination when compared to other digital currencies such as Bitcoin and Ethereum. IOTA utilizes decentralized entity technology to reach secure consensus in a peer-to-peer system. Said differently, IOTA utilizes distributed ledger technology (DLT), and broadcasts transactions between IoT devices to the DLT, which records the transaction as an immutable record when the transaction reaches consensus.

As used herein, the term "decentralized entity" refers to an open-source, public, distributed computing platform. In some examples, a decentralized entity may be a part of a public platform such as a public cloud. In some examples, the decentralized entity may be deployed on a private network such as a private cloud. The decentralized entity may include DLT. The DLT includes a consensus of replicated, shared, and synchronized digital data which may be spread across multiple computing devices. In some examples, the decentralized entity may be a blockchain-based distributed computing platform. In other examples, the decentralized entity may be a data structure based on a Directed Acyclic Graph (e.g., Tangle) network. For example, each participant of a Directed Acyclic Graph included in the network that wants to make a new transaction may actively participate in the consensus of the network by approving two past transactions. The consensus of the network presents technological challenges for IoT device environments because some IoT devices may not have a powerful system on chip (SOC) and may be unable to complete the consensus for payment transactions, and/or may be unable to monitor business policies, which may be a threat to the security of the transaction.

As such, examples discussed herein provide examples of utilizing a computing device, such as a server, which may deliver business security policies, logistics, and the IOTA consensus to complete the transaction. For example, a server may be in contact with multiple IoT devices which may be generating transactions between each other. The IoT devices may offload transaction information to the server, and the server may generate a meta transaction based on the transaction information. The server may complete the transaction by generating a transaction bundle and completing the digital currency (e.g., IOTA) consensus. In another example, the server may include business policies, wherein the business policies include a list of trusted list of entities to which payment transactions may be initiated by multiple IoT devices. For example, the server may include a list of trusted entities (and/or IoT devices related to the entities) that the IoT device may participate in transactions. In this way, the server may receive transaction information from an IoT device, perform the consensus, and maintain security by checking the transaction against the trusted list.

FIG. 1 illustrates an example system 100 including a server 102 to generate transaction bundles 118 for IoT devices 106 consistent with the disclosure. The system 100 of FIG. 1 illustrates a server 102, a controller 104, a meta transaction 110, an input transaction 112, an output transaction 114, an unspent transaction 116, a transaction bundle 118, a first IoT device 106-1, a Nth IoT device 106-N, a payment 108, and a decentralized entity 152. The first IoT device 106-1 and the Nth IoT device 106-N may be collectively referred to herein as the IoT devices 106 or the plurality of IoT devices 106. The plurality of IoT devices 106 may be in communication with each other and the server 102. The server 102 may monitor the plurality of IoT devices 106 for the payment 108 initiated between the plurality of IoT devices 106. In some examples, the controller 104 may include a memory resource and a processing resource to execute instructions to generate transaction bundles 118 and complete a transaction consensus for IoT payments.

Although not illustrated in FIG. 1, as to not obscure the examples of the disclosure, the controller 104 may include a processing resource. For example, the processing resource may be central processing units (CPUs), semiconductor-based microprocessors, and/or other hardware devices suitable for retrieval and execution of instructions stored in a memory resource (e.g., in a non-transitory computer readable medium). The example processing resource may fetch, decode, and execute instructions. As an alternative, or in addition to, retrieving and executing instructions, the example processing resource may include an electronic circuit that may include electronic components for performing the functionality of executed instructions.

In some examples, the processing resource may be a plurality of hardware processing units that may cause machine-readable instructions to be executed. The processing resource may include central processing units (CPUs) among other types of processing units. The memory resource may be any type of volatile or non-volatile memory or storage, such as random-access memory (RAM), flash memory, storage volumes, a hard disk, or a combination thereof. Utilizing the controller 104 and the processing resource, and the memory resource, the server 102 may facilitate payments between the plurality of IoT device 106.

As used herein, the term "payment" refers to a mutually agreed upon exchange of data, currency, and/or another unit of perceived value. For example, a payment may be a digital currency such as IOTA. As mentioned IoT devices 106 may be devices enabled to communicate and exchange payment 108 between each other. For example, the first IoT device 106-1 may be a vehicle and the Nth IoT device 106-N may be a fuel station with an IoT capable interface. The vehicle (the first IoT device 106-1) and the fuel station (the Nth IoT device 106-N) may utilize the server 102 to participate in a transaction for a payment 108 using a digital currency such as IOTA. The server 102 may include business policies that may be applied to the transactions and/or the IoT devices 106 that may be monitored by the server 102. For example, the server 102 may monitor the vehicle and determine if the vehicle may purchase fuel from the fuel station. As used herein, the term "business policy" refers to a rule and/or multiple rules that may be mandated by an entity. For example, the server 102 may be a device of a corporation which may be monitoring the first IoT device 106-1 (the vehicle), and when the vehicle initiates a transaction with the Nth IoT device 106-N (e.g., the fuel station) the server 102 may refer to business policies set by the corporation to determine if the transaction may proceed.

Specifically, the server 102 may check a trusted list included in the controller 104 (and/or the server) to verify that the first IoT device 106-1 (the vehicle) may participate in a transaction with the Nth IoT device 106-N (the fuel station). As used herein, the term "list" and/or "trusted list" refers to a list of approved devices and/or entities which may participate in transactions. For example, the trusted list may include business policies and/or rules about what types of transactions are allowed by the server 102. The list is discussed in further detail in connection with FIG. 2. In some examples, the server 102, via the controller 104 may create a meta transaction 110 including information about the first IoT device 106-1 of the plurality of IoT devices 106.

As used herein, the term "meta transaction" refers to a transaction that does not hold a value but includes encrypted information about the IoT devices 106 that are participating in the transaction. The meta transaction 110 may include information about an IoT device (e.g., the first IoT device 106-1) and a signature of the IoT device which may be used to verify a transaction. Meta transactions may be created by the server 102 and may be unknown to the IoT devices 106. The meta transaction 110 may include information about the IoT devices 106 included in the transaction, a signature of a private key (e.g., a signatureMessageFragment), a message, and/or a secret key which may be used to validate the payment 108 information. In some examples, the signatureMessageFragment includes the signature of the transmitting first IoT device 106-1, a portion of the signature, and/or a message. For example, a meta transaction 110 may include information about the IoT devices 106 involved in the transaction for payment 108, and because the meta transaction 110 is generated by the server 102 and unknown to the IoT devices 106 the meta transaction 110 may be used to verify the transaction. In other words, instead of the meta transaction 110 being created by the IoT devices 106, the server 102 may create the meta transaction 110 and use the signatureMessageFragment to verify the transaction. The meta transaction 110 may be created with information about the IoT devices 106, when the IoT devices 106 generate the transactions to build a transaction bundle 118.

For example, the controller 104 may receive an input transaction 112, an output transaction 114, and an unspent transaction 116 from the first IoT device 106-1 when the first IoT device 106-1 is involved in a transaction. As described herein, the input transaction 112, the output transaction 114, the unspent transaction 116, and the meta transaction 110 may together create the transaction bundle 118. As used herein, the term "input transaction" refers to an address of the sender where the input transaction 112 comprises an amount of digital currency (e.g., IOTA). In other words, the sender may be an IoT device, and the sender may have multiple addresses corresponding to it where each address may comprise digital currency. In other words, an IoT device may have several addresses, where each address has a quantity of IOTA. For example, an input transaction 112 may include a positive number which may indicate the leftover amount of IOTA that an address of the input transaction 112 included. In other words, if the payment 108 is five IOTA and the address (e.g., the address of the first IoT device 106-1) of the input transaction 112 had eight IOTA, the input transaction 112 may have the number three, which may indicate the amount of leftover IOTA. In contrast, an input transaction 112 with the number zero may indicate that the address of the sending IoT device does not have any IOTA left over. As such, several input transactions 112, each corresponding to a different address of the first IoT device 106-1 (the sending IoT device in this instance) may be utilized to accumulate the appropriate amount of IOTA to complete payment 108.

As used herein, the term "output transaction" refers to a transaction indicating an address of the destination of the payment 108. For example, if the first IoT device 106-1 is sending IOTA to the Nth IoT device 106-N, the output transaction 114 may include the address of the Nth IoT device 106-N. The output transaction 114 may include multiple addresses for multiple IoT devices, where the values of IOTA included in the output transaction 114 is greater than zero, and the addresses are not that of the sender. The first IoT device 106-1 may have unspent IOTA left over from the transaction and payment 108 to the recipient Nth IoT device 106-N. This leftover IOTA may be relegated to the unspent transaction 116. As used herein, the term "unspent transaction" refers to the output of digital currency (e.g., IOTA) that is leftover from a transaction. For example, if the transmitting first IoT device 106-1 is has an input transaction 112 with an address including eight IOTA and transmits a payment 108 of five IOTA to the recipient Nth IoT device 106-N, the remaining three IOTA may be placed into an unspent transaction 116 with a new address corresponding to the first IoT device 106-1. In this instance, the address with the unspent three IOTA may become the input transaction 112 of a subsequent transaction. Said differently, the unspent transaction 116 may include the leftover quantity of IOTA currency to be included in a new address for the first IoT device 106-1. The server 102 may receive the input transaction 112, the output transaction 114, and the unspent transaction 116 to generate the transaction bundle 118.

For example, the first IoT device 106-1 may request to transact with the Nth IoT device 106-N for an IOTA payment 108. The server 102 may refer to the trusted list and determine that the first IoT device 106-1 is permitted to participate in a transaction with the Nth IoT device 106-N. As such, the server 102 may identify the account information for the recipient Nth IoT device 106-N. The first IoT device 106-1 may initiate building the transaction bundle 118 by creating the input transaction 112 and transmitting it to the server 102, creating the output transaction 114 and transmitting it to the server 102, and creating the unspent transaction 116 and transmitting it to the server 102. In response to receiving the transactions from the first IoT device 106-1, the server 102 via the controller 104, may generate a transaction bundle 118 including the output transaction 114, the input transaction 112, the unspent transaction 116, and the meta transaction 110. The server 102 may secure and verify the transaction bundle 118.

For example, the server 102 may apply a hash to the transaction bundle 118 and verify a signature from the first IoT device 106-1 on the hashed transaction bundle 118 to the meta transaction 110. As used herein, the term "hash" refers to the application of a hash function and/or to a cryptographic series of numbers and characters to act as a digital fingerprint applied to a piece of information to secure the information, prevent error, and/or be stored with a transaction on the immutable record. For example, in the instance of IOTA transactions, the hash function used may be a Kerl function and/or a Curl function which are designed for IoT devices. In this way, the first IoT device 106-1 may apply a signature to the transaction bundle 118 and the server 102 may compare the signature applied to the transaction bundle 118 to the signature included in the meta transaction 110. If the signatures match, the transaction is validated.

In other words, because the server 102 may be monitoring the plurality of IoT devices 106, the server 102 may identify a signature associated with the sending IoT device, which in this case is the first IoT device 106-1. Because the first IoT device 106-1 is unaware of the contents of the meta transaction 110, the server 102 may verify the transaction bundle 118 by comparing the signature of the meta transaction 110 to the signature of the first IoT device 106-1. In this way, the IoT devices 106, which may be monitored by the server 102, may refrain from proceeding with transactions including devices, entities, and/or other IoT devices which may not be on the trusted list. The server 102 may generate the consensus for the IoT devices 106 when the transaction bundle is verified 118.

For example, the server 102 may initiate a consensus of the hashed transaction bundle 118 within a decentralized entity 152 (e.g., Tangle). The server 102 may initiate the consensus of the hashed transaction bundle 118 such that it may be included as an immutable record in the decentralized entity 152. IoT devices may not have adequate SOC to perform the consensus and the server 102 may monitor the IoT devices 106 such that business policies may be applied to the IoT devices 106 prior to a transaction concluding. The server 102, via the controller 104 may initiate the execution of a Markov Chain Monte Carlo (MCMC) technique, in response to the verification of the signature, to identify a trunk and a branch within the transaction bundle. As used herein, the term "trunk" refers to a hash of each of the transactions in the transaction bundle 118. The trunk hash is used to link the transactions within the transaction bundle 118 together. As used herein, the term "branch" refers to a hash of an unrelated (e.g., randomly selected) transaction in the decentralized entity (e.g., Tangle). The trunk and the branch are utilized to store the transaction bundle 118 as an immutable record in the decentralized entity 152 and are used to identify the Nonce by executing a Proof of Work (POW) technique.

For example, because the plurality of IoT devices 106 may not have a powerful SOC, the server 102 may identify a Nonce by performing a POW technique. The identification of the Nonce may permit the hashed transaction bundle 118 to be accepted into the decentralized entity 152 such as Tangle. An example of the POW used for transactions using digital currencies such as IOTA is called Pearl Diver. As such, when the Nonce is identified by the server 102, it is added to the transaction bundle 118.

The examples described in connection with FIG. 1 describe generating transaction bundles 118 for IoT devices 106. The popularity of IoT devices (e.g., the IoT devices 106) may generate scalability and security difficulties for transactions between IoT devices 106. IoT devices may utilize an IOTA digital currency (among others mentioned) and the decentralized entities 152 such as Tangle (and/or blockchain) to complete transactions between IoT devices 106. Some IoT devices 106 are not designed to include a powerful SOC, as such, the POW techniques demanded to identify the Nonce are difficult to obtain. As such, offloading the creation of the meta transaction 110 to a server 102 allows the server 102 to create a the meta transaction 110, create and hash the transaction bundle 118, and perform the POW to identify the Nonce. Additionally, the server 102 may monitor the IoT devices 106 and apply business policies to IoT devices 106 within a network.

Figure 2:
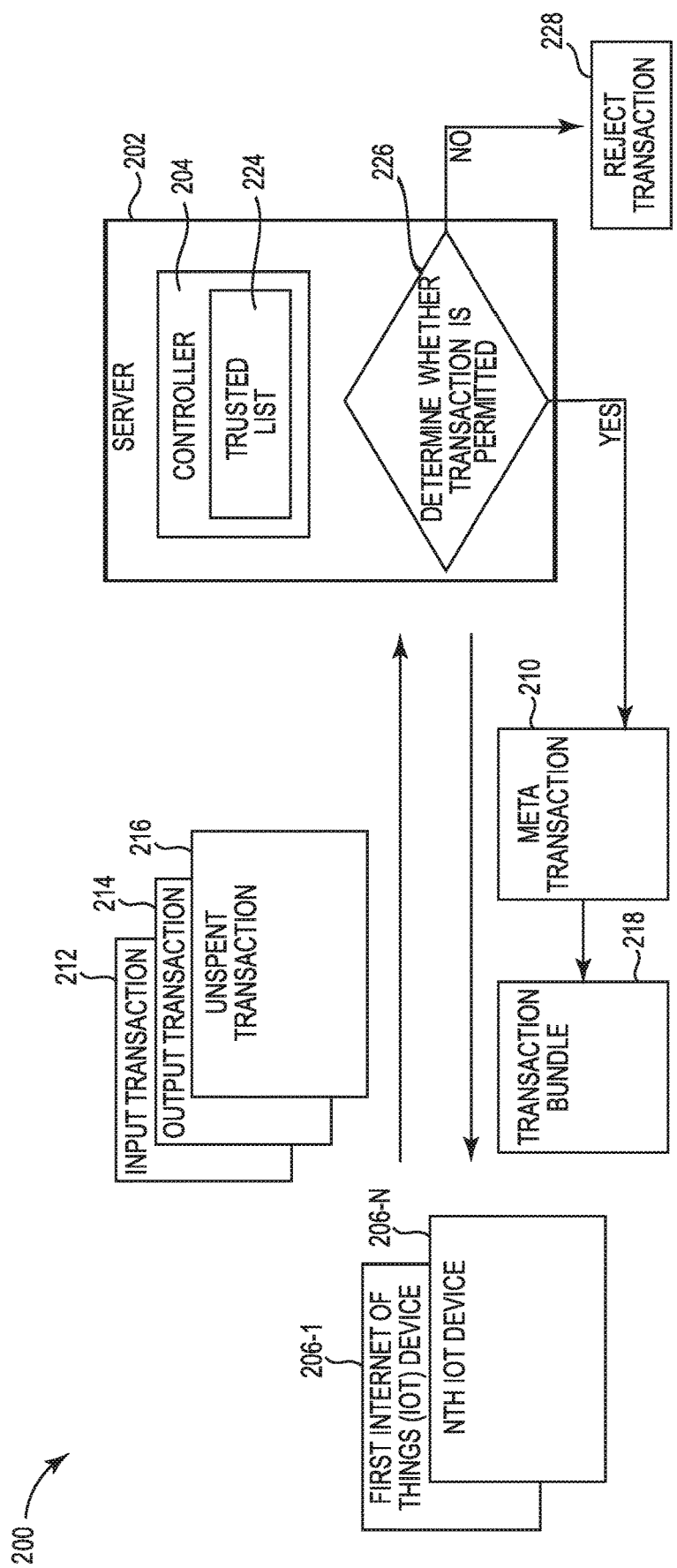
FIG. 2 illustrates an example system including a server to generate transaction bundles for IoT devices consistent with the disclosure.

FIG. 2 illustrates an example system 200 including a server 202 to generate transaction bundles 218 for IoT devices 206 consistent with the disclosure. The system 200 of FIG. 2 illustrates a server 202, a controller 204, a trusted list 224, a meta transaction 210, an input transaction 212, an output transaction 214, an unspent transaction 216, a transaction bundle 218, a first IoT device 206-1, and a Nth IoT device 206-N. The first IoT device 206-1 and the Nth IoT device 206-N may be collectively referred to herein as the IoT devices 206 or the plurality of IoT devices 206. The plurality of IoT devices 206 may be in communication with each other and the server 202. As mentioned herein, in some examples, the controller 204 may include a memory resource and a processing resource to execute instructions to generate transaction bundles 218 and complete a transaction consensus for IoT payments. The server 202 may monitor the plurality of IoT devices 206 for a payment initiated between the plurality of IoT devices 206.

For example, the controller 204 may create a meta transaction 210 including information about a payment (e.g., the payment 108 of FIG. 1) from an IoT device such as the first IoT device 206-1. For example, the first IoT device 206-1 may be in communication with the Nth IoT device 206-N and may request to complete a transaction with the Nth IoT device 206-N. In some examples, the meta transaction 210 may be created by the controller 204 in response to the first IoT device 206-1 generating an input transaction 212. As mentioned, the server 202 may monitor the IoT devices 206 for payments, including subsequent payments from the first IoT device 206-1. As such, the server 202 may receive information from the first IoT device 206-1 about the payment via an output transaction 214, an input transaction 212, and an unspent transaction 216. The server 202 may determine if the transaction information received from the first IoT device 206-1 may be completed based on business policies and the trusted list 224.

For example, the server 202 may include a trusted list 224. The trusted list 224 may include business policies such as currency amounts allowed, time period for transactions, permitted entities, etc. In this example, the controller 204 may comprise the trusted list 224 of entities, and the entities on the trusted list 224 are permitted to participate in the payment with the first IoT device 206-1. In some examples, the server 202 and/or the controller 204 may accept or reject a transaction.

For example, the server 202 may receive information from the first IoT device 206-1 about the payment via an output transaction 214, an input transaction 212, and an unspent transaction 216. In this example, the transaction information may indicate that the first IoT device 206-1 has requested to pay the Nth IoT device 206-N an amount of digital currency (e.g., IOTA). The server 202 may check the business policies which may be included on the trusted list 224. For example, at 226, the server 202 may determine whether a transaction is permitted based on the business policies and the trusted list 224. When the server 202 concludes that the transaction is permitted, ("YES"), the server 202 may generate the transaction bundle 218 including the meta transaction 210, the input transaction 212, the output transaction 214, and the unspent transaction 216. In this instance, the transaction bundle 218 may describe a quantity of IOTA currency to be paid to the Nth IoT device 206-N to the first IoT device 206-1. The server 202 may generate the consensus when the transaction is verified.

For example, the server 202 may receive a signature from the first IoT device 206-1 corresponding to the transaction bundle 218 and the server 202 may verify the signature of the first IoT device 206-1 with the signature (and/or the signatureMessageFragment) included in the meta transaction 210. In some examples, the server 202 may save the meta transaction 210 as a heuristic record. When the transaction bundle 218 is verified, the server may hash the transaction bundle 218, find the Nonce, and store the transaction as an immutable record in a decentralized entity (e.g., the decentralized entity 152 of FIG. 1). In some examples, the server 202 may compare transaction information received from the IoT devices 206 to the trusted list 224 and determine that the transaction violates business policies and reject the transaction at 228.

For example, the server 202 may receive information from the first IoT device 206-1 about the payment via an output transaction 214, an input transaction 212, and an unspent transaction 216. In this example, the transaction information may indicate that the first IoT device 206-1 has requested to pay the Nth IoT device 206-N an amount of digital currency (e.g., IOTA). The server 202 may check the business policies which may be included on the trusted list 224. For example, at 226, the server 202 may determine whether a transaction is permitted based on the business policies and the trusted list 224. When the server 202 concludes that the transaction is not permitted, ("NO"), the server 202 may reject the transaction 228. For example, in response to the rejected transaction at 228, the server 202 may not generate the transaction bundle 218 to include the meta transaction 210, the input transaction 212, the output transaction 214, and the unspent transaction 216. In some examples, the business policies may outline rules such as a time of day or a quantity of digital currency which may be permitted in a transaction.

For example, the trusted list 224 may include rules which may allow multiple payments between the first IoT device 206-1 and the Nth IoT device 206-N to transpire, but the server 202 via the controller 204 may reject a subsequent payment initiated by the first IoT device 206-1 when the first IoT device 206-1 initiates a transaction with a non-trusted entity (e.g., an entity absent from the trusted list). In this instance, the server 202 may monitor a plurality of IoT devices 206 and payments via transaction bundles 218.

The examples described in connection with FIG. 2 describe generating transaction bundles 218 for IoT devices 206 when the transactions and payments are allowed. The server 202 may monitor a plurality of IoT devices 206 to determine if the transactions are allowed such that the transactions may not be verified or completed when they violate business policies and/or the trusted list. The server 202 may include a trusted list 224 which may include business policies and a list of entities which are allowed to participate in transactions, and the server may reject the transaction based on the trusted list 224. In this way, the server 202 may provide additional security and may enforce the policies of the entities which may be in control of the server and/or the monitoring of he IoT devices 206. Because the transactions between the IoT devices 206 exchange digital currency (e.g., IOTA) the server 202 may provide extra security to protect the currency controlled by the entities.

Figure 3:
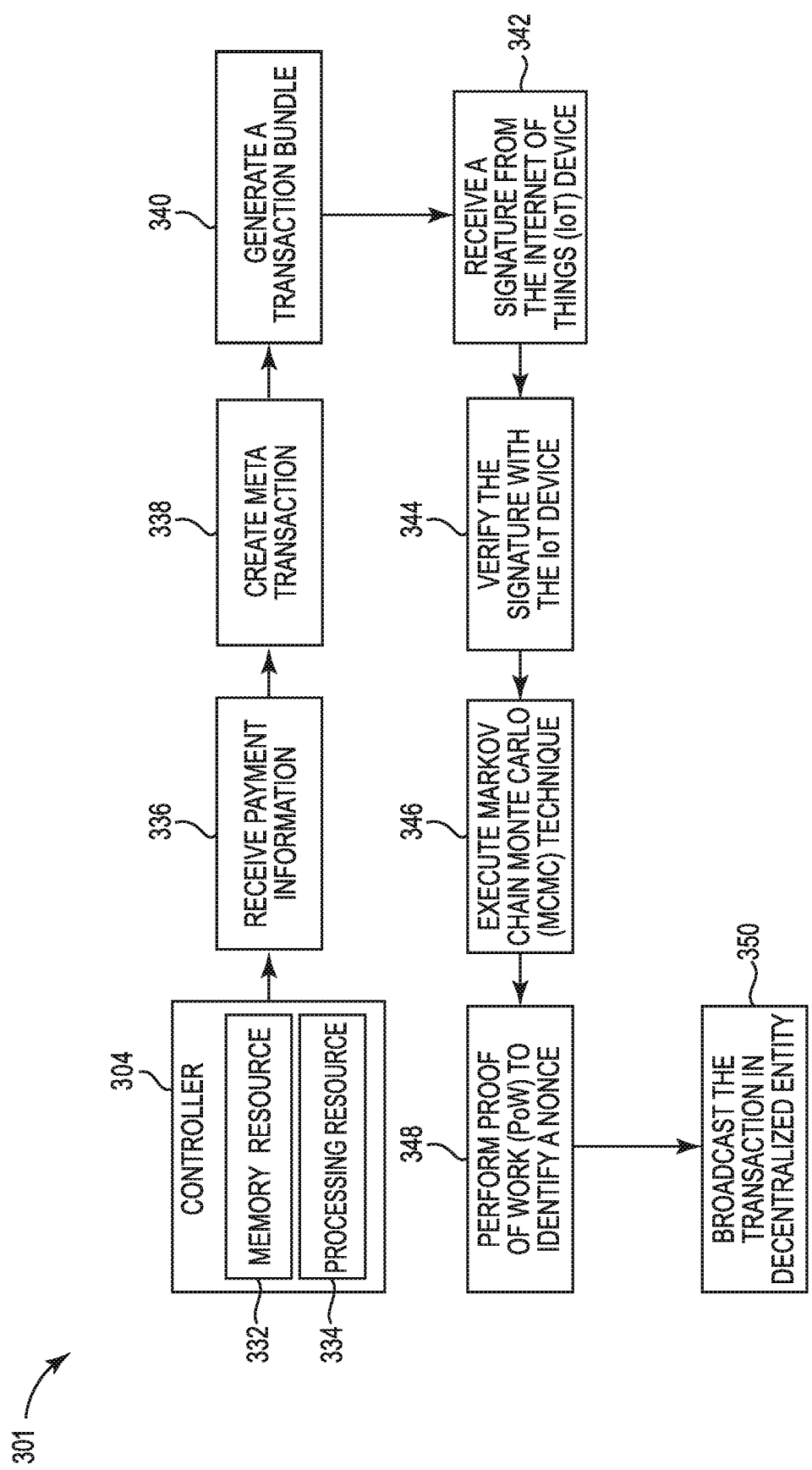
FIG. 3 illustrates an example flow diagram for transaction bundles for IoT devices consistent with the disclosure.

FIG. 3 illustrates an example flow diagram 301 for transaction bundles for IoT devices consistent with the disclosure. FIG. 3 illustrates a controller 304 including a memory resource 332 and a processing resource 334 to execute instructions stored by the memory resource (e.g., a non-transitory computer readable medium) to create transaction bundles (e.g., transaction bundle 118) and verify transactions to be stored as an immutable record in a decentralized entity (e.g., the decentralized entity 152). For example, the controller 304 may be included as a part of a server (e.g., the server 102), to monitor a plurality of IoT devices (e.g., the IoT devices 106) for transaction information. For example, the controller 304 may determine that an IoT device has generated transaction information such as an input transaction (e.g., the input transaction 112), an output transaction (e.g., the output transaction 114), and/or an unspent transaction (e.g., the unspent transaction 116). In response to the determination that the IoT device has generated transaction information, the controller 304, at 336 may receive payment information.

For example, the IoT device may offload the transaction information to the server and/or the controller 304. In other words, the controller 304 at 336 may receive payment information based on the transaction information. For example, the controller 304 may receive information about a first IoT device that is sending the digital currency (e.g., IOTA) and the Nth IoT device that is receiving the IOTA. The controller may check a trusted list (e.g., the trusted list 224) to determine if the transaction information is permitted based on the allowed entities and business policies included in the trusted list. In response to the receipt of payment information at 336, the IoT device may generate a meta transaction at 338 based on the transaction information (and the received payment information. Because IoT devices may not include powerful SOC, the controller 304, at 340, may generate a transaction bundle (e.g., the transaction bundle 118) including the meta transaction, the input transaction, the output transaction, and the unspent transaction. The IoT device may sign the transaction bundle, and the controller 304 may compare the signature of the transaction bundle to the meta transaction.

For example, the controller 304, at 342 may receive the signature from the IoT device. Because the IoT device did not create the meta transaction, the controller 304 (and/or the server) may verify, at 344, that the signatures match and allow the transaction to proceed. For example, the controller 304 may apply a hash to the transaction bundle and verify the signature from the IoT device on the hashed transaction bundle to the meta transaction. For example, the IOTA digital currency uses an IOTA hash function e.g., a Curl function and/or a Kerl function which are designed for IoT devices. In this way, the IoT device may apply a signature to the transaction bundle and the server may compare the signature applied to the transaction bundle to the signature included in the meta transaction. If the signatures match, the transaction is validated.

Further, because IoT devices may not have adequate SOC to perform the consensus and the controller 304 may monitor the IoT devices such that business policies may be applied to the IoT devices prior to a transaction concluding. The server, via the controller 304 may initiate the execution of a MCMC technique at 346, in response to the verification of the signature. Again, because the plurality of IoT devices may not have a powerful SOC, the controller 304 may identify a Nonce by performing a POW technique. The identification of the Nonce may permit the hashed transaction bundle to be accepted into the decentralized entity such as Tangle. As such, at 348, the controller may POW to identify a Nonce. As such, when the Nonce is identified by the controller 304, it is added to the transaction bundle. Once the Nonce is identified, the controller 304, at 350, may broadcast the transaction to the decentralized entity (e.g., Tangle). In this way, the controller 304 may monitor a plurality of IoT devices, and the controller 304 (and/or the server) may generate a unique transaction bundle for IoT devices of a plurality of IoT devices when payments are initiated by the IoT devices.

The examples described in connection with FIG. 3 describe generating transaction bundles for IoT devices when the transactions and payments are allowed. The controller 304 generates the Nonce and the consensus of the transaction because IoT devices may not include a sufficient SOC. Further, because the controller 304 creates the meta transaction, the server may abort the transaction and enforce business policies. As such the controller 304 and or the server may govern which transactions are permitted by the server and reject the transactions that are not permitted.

Figure 4:
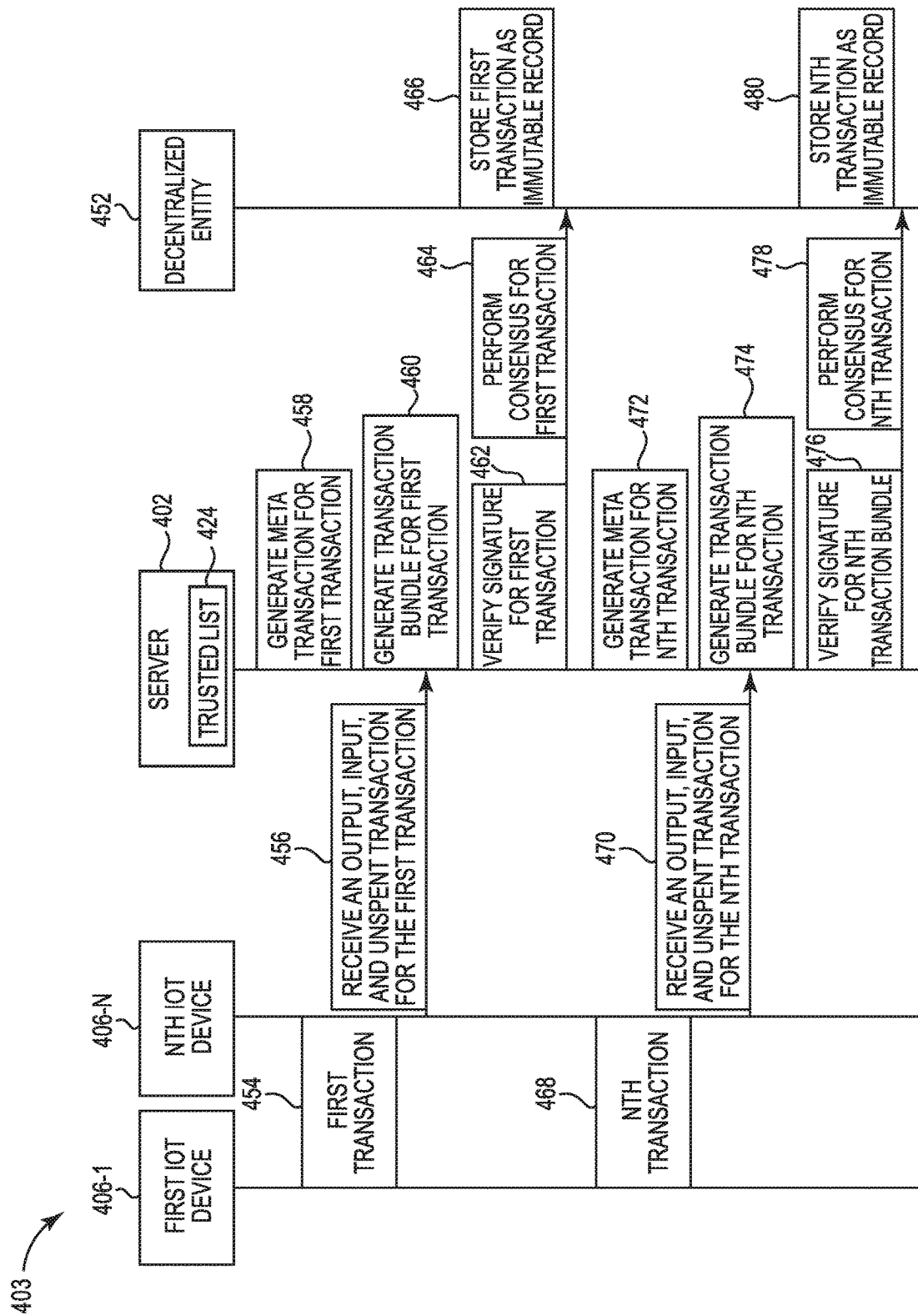
FIG. 4 illustrates an example message flow for transaction bundles for IoT devices consistent with the disclosure.

FIG. 4 illustrates an example message flow 403 for transaction bundles for IoT devices consistent with the disclosure. The message flow 403 of FIG. 4 illustrates a server 402, a trusted list 424, a decentralized entity 452, a first IoT device 406-1, and a Nth IoT device 406-N. The first IoT device 406-1 and the Nth IoT device 406-N may be collectively referred to herein as the IoT devices 406 or the plurality of IoT devices 406. Although not illustrated in FIG. 4 as to not obscure examples of the disclosure, the server may include a controller (e.g., the controller 104), a processing resource (e.g., the processing resource 334), and a memory resource 332. The example message flow 403 illustrated by FIG. 4 illustrates a message flow including multiple transactions.

For example, the first IoT device 406-1 and the Nth IoT device 406-N may be in communication with each other. The first IoT device may request at 454, to complete a first transaction with the Nth IoT device 406-N. For example, the first IoT device 406-1 may request to transact with the Nth IoT device 406-N for an IOTA payment (e.g., the payment 108). The server 402 may refer to the trusted list 424 and determine that the first IoT device 406-1 is permitted to participate in a transaction with the Nth IoT device 406-N. As such, the server 402 may identify the account information for the recipient Nth IoT device 406-N. The first IoT device 406-1 may initiate building the transaction bundle (e.g., the transaction bundle 118) for the first transaction (at 456) by creating the input transaction (e.g., the input transaction 112) and transmitting it to the server 402, creating the output transaction (e.g., the output transaction 114) and transmitting it to the server 402, and creating the unspent transaction (e.g., the unspent transaction 116) and transmitting it to the server 402. In response to receiving the transactions from the first IoT device 406-1, the server 402 may generate a meta transaction (e.g., the meta transaction 110) for the first transaction at 458 and generate a transaction bundle, at 460, for the first transaction and including the output transaction, the input transaction, the unspent transaction, and the meta transaction. The server 402 may secure and verify the transaction bundle.

For example, at 462, the server 402 may verify signatures for the first transaction. The server 402 may apply a hash to the transaction bundle for the first transaction and verify a signature from the first IoT device 406-1 on the hashed transaction bundle to the meta transaction. In this way, the first IoT device 406-1 may apply a signature to the transaction bundle of the first transaction and the server 402 may compare the signature applied to the transaction bundle to the signature included in the meta transaction. If the signatures match, the transaction is validated.

In other words, because the server 402 may be monitoring the plurality of IoT devices 406, the server 402 may identify a signature associated with the sending IoT device, which in this case the first IoT device 406-1. The server 402 may perform the consensus for the first transaction at 464. As mentioned, IoT devices may not have adequate SOC to perform the consensus and the server 402 may monitor the IoT devices 406 such that business policies may be applied to the IoT devices 406 prior to a transaction concluding. The server 402 may initiate the execution of a MCMC technique, in response to the verification of the signature, to identify a trunk and a branch within the transaction bundle. The trunk and the branch are utilized to store the transaction bundle as an immutable record in the decentralized entity 452 and are used to identify the Nonce by executing a Proof of Work (POW) technique. Once the Nonce is identified by the server 402, the server may broadcast the first transaction as an immutable record on the decentralized entity. In other words, the first transaction may be stored by the server 402, at 466, as an immutable record in the decentralized entity 452 (e.g., Tangle). The first IoT device 406-1 may participate in a Nth transaction at 468 where the server creates a new meta transaction for subsequent payments (e.g., transactions) initiated by the plurality of devices.

For example, the first IoT device 406-1 and the Nth IoT device 406-N may be in communication with each other. The first IoT device may request at 468, to complete a Nth transaction with the Nth IoT device 406-N. For example, the first IoT device 406-1 may request to transact with the Nth IoT device 406-N for an IOTA payment. The server 402 may refer to the trusted list 424 and determine that the first IoT device 406-1 is permitted to participate in a Nth transaction with the Nth IoT device 406-N. As such, the server 402 may identify the account information for the recipient Nth IoT device 406-N. The first IoT device 406-1 may initiate building the transaction bundle for the Nth transaction (at 470) by creating the input transaction and transmitting it to the server 402, creating the output transaction and transmitting it to the server 402, and creating the unspent transaction and transmitting it to the server 402. In response to receiving the transactions from the first IoT device 406-1, the server 402 may generate a new meta transaction for the Nth transaction at 472 and generate a transaction bundle, at 474, for the Nth transaction and including the output transaction, the input transaction, the unspent transaction, and the meta transaction. The server 402 may secure and verify the transaction bundle.

For example, at 476, the server 402 may verify signatures for the Nth transaction. The server 402 may apply a hash to the transaction bundle for the Nth transaction and verify a signature from the first IoT device 406-1 on the hashed transaction bundle to the meta transaction. In this way, the first IoT device 406-1 may apply a signature to the transaction bundle of the Nth transaction and the server 402 may compare the signature applied to the transaction bundle to the signature included in the meta transaction. If the signatures match, the transaction is validated.

In other words, because the server 402 may be monitoring the plurality of IoT devices 406, the server 402 may identify a signature associated with the sending IoT device, which in this case the first IoT device 406-1. The server 402 may perform the consensus for the Nth transaction at 478. As mentioned, IoT devices may not have adequate SOC to perform the consensus and the server 402 may monitor the IoT devices 406 such that business policies may be applied to the IoT devices 406 prior to a transaction concluding. The server 402 may initiate the execution of a MCMC technique, in response to the verification of the signature, to identify a trunk and a branch within the transaction bundle. The trunk and the branch are utilized to store the transaction bundle as an immutable record in the decentralized entity 452 and are used to identify the Nonce by executing a Proof of Work (POW) technique. Once the Nonce is identified by the server 402, the server may broadcast the Nth transaction as an immutable record on the decentralized entity. In other words, the Nth transaction may be stored by the server 402, at 480, as an immutable record in the decentralized entity 452 (e.g., Tangle).

The examples described in connection with FIG. 4 describe generating transaction bundles for IoT devices when the transactions and payments are allowed. The server 402 may monitor the plurality of IoT devices 406 and generate a new meta transaction for each transaction (e.g., payment) initiated by the plurality of IoT devices 406. The server 402 may extract the payment information to build transaction bundles to securely hash and perform the consensus for digital currency payments between IoT devices.

Figure 5:
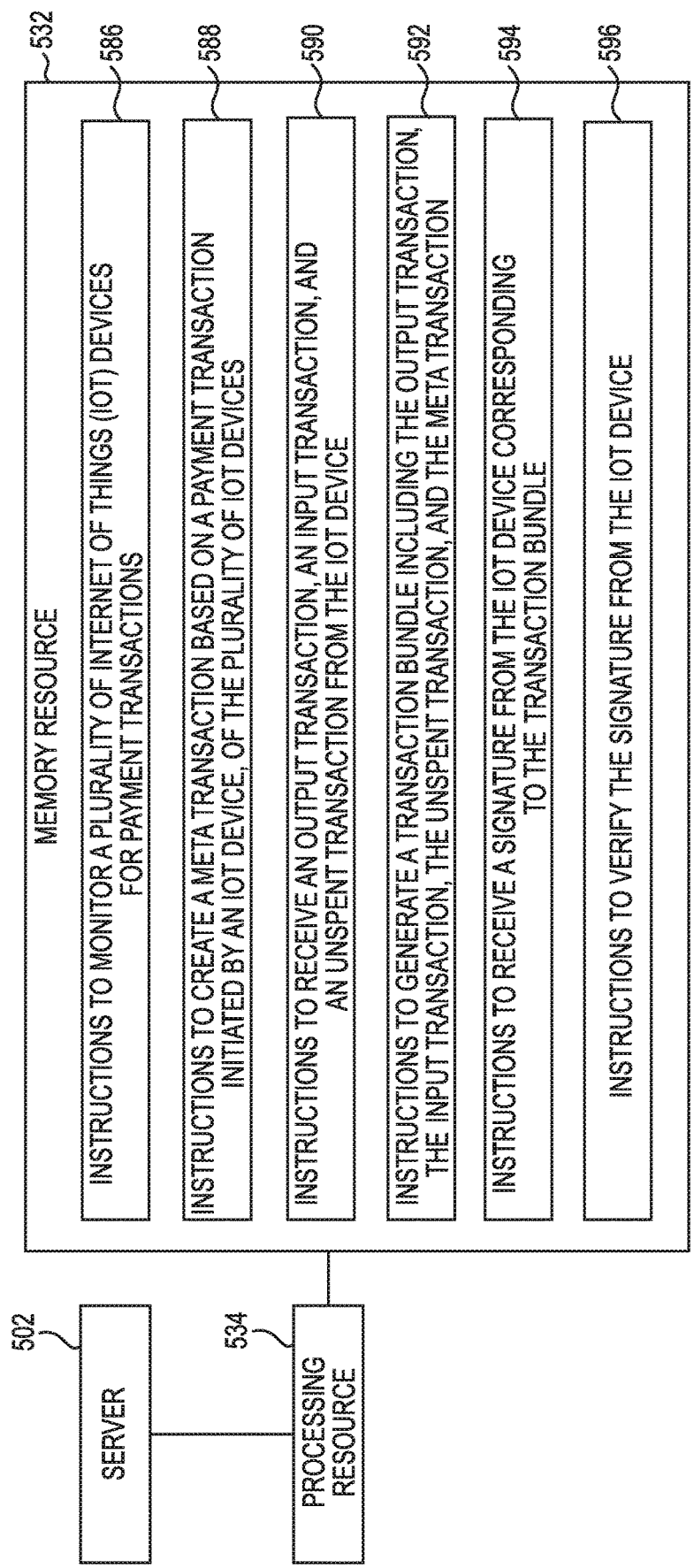
FIG. 5 illustrates an example of a non-transitory machine-readable memory resource and processing resource for transaction bundles for IoT devices consistent with the disclosure.

FIG. 5 illustrates an example of a non-transitory machine-readable memory resource 532, processing resource 534, and a server 502 for transaction bundles for IoT devices consistent with the disclosure. Although not illustrated in FIG. 5 as to not obstruct the examples of the disclosure, the processing resource 534 and the memory resource 532 may be included in a controller (e.g., the controller 104). The processing resource 534 may be a hardware processing unit such as a microprocessor, microcontroller, application specific instruction set processor, coprocessor, network processor, or similar hardware circuitry that may cause machine-readable instructions to be executed. In some examples, the processing resource 534 may be a plurality of hardware processing units that may cause machine-readable instructions to be executed. The processing resource 534 may include central processing units (CPUs) among other types of processing units. The memory resource 532 may be any type of volatile or non-volatile memory or storage, such as random-access memory (RAM), flash memory, read-only memory (ROM), storage volumes, a hard disk, or a combination thereof.

The memory resource 532 may store instructions thereon, such as instructions 586, 588, 590, 592, 594, and 596. When executed by the processing resource 534, the instructions may cause the server to perform specific tasks and/or functions. For example, the memory resource 532 may store instructions 586 which may be executed by the processing resource 534 to cause the server 502 to monitor a plurality of internet of things (IoT) devices (e.g., the IoT devices 106) for payment (e.g., the payment 108) transactions. For example, a first IoT device (e.g., the first IoT device 106-1) may request to transact with the Nth IoT device (e.g., the Nth IoT device 106-N) for an IOTA payment. The server 502 may refer to a trusted list (e.g., the trusted list 224) and determine that the first IoT device is permitted to participate in a transaction with the Nth IoT device. The server 502 may create a meta transaction (e.g., the meta transaction 110) to verify transaction information form the IoT devices.

For example, the memory resource 532 may store instructions 588 which may be executed by the processing resource 534 to create a meta transaction based on a payment transaction initiated by an IoT device (e.g., the first IoT device), of the plurality of IoT devices. For example, the meta transaction may include information about the IoT device (e.g., the first IoT device) and a signature of the IoT device which may be used to verify a transaction. The transaction information may be offloaded from the IoT device to the server 502.

For example, the memory resource 532 may store instructions 590 which may be executed by the processing resource 534 to receive an output transaction (e.g., the output transaction 114), an input transaction (e.g., the input transaction 112), and an unspent transaction (e.g., the unspent transaction 116) from the IoT device. In this example, the transaction information received from the IoT device may be used to generate a transaction bundle (e.g., the transaction bundle 118).

For example, the memory resource 532 may store instructions 592 which may be executed by the processing resource 534 to generate a transaction bundle including the output transaction, the input transaction, the unspent transaction, and the meta transaction. In some examples, the server may compare the transaction information to a trusted list to confirm that the transaction may continue. When the server 502 determines that the transaction may not continue, the server 502 may abort the transaction. When the server 502 determines that the transaction is permitted, it may compare a signatureMessageFragment of the meta transaction to the transaction bundle.

For example, the memory resource 532 may store instructions 594 which may be executed by the processing resource 534 to receive a signature from the IoT device corresponding to the transaction bundle. For example, the server 502 may receive a signature from the IoT device when the IoT device signs the transaction bundle. Because the IoT device did not create the meta transaction, the server 502 may determine if the signatures match.

For example, the memory resource 532 may store instructions 594 which may be executed by the processing resource 534 to verify the signature from the IoT device. For example, the server 502 may verify signatures for the transaction. The server 502 may apply a hash to the transaction bundle for the transaction and verify a signature from the IoT device on the hashed transaction bundle to the meta transaction. Further, the processing resource 534 may identify a nonce corresponding to the generated transaction bundle in response to the verification of the signature from the IoT device. When the Nonce is identified, the transaction may be broadcast on a decentralized entity such as Tangle or blockchain.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A controller, comprising:
  a hardware processor
  a memory having instructions stored thereon that when executed by the hardware processor cause the hardware processor to:
    create a meta transaction including information about a payment from an Internet of Things (IoT) device, wherein the meta transaction is created in response to the IoT device generating an input transaction and the payment is based on a determination to accept or reject the payment further based on a trusted list of entities, the trusted list of entities including the entities that are permitted to participate in the payment with the IoT device;
    receive information from the IoT device about the payment via an output transaction, an input transaction, and an unspent transaction;
    generate a transaction bundle including the output transaction, the input transaction, the un-spent transaction, and the meta transaction;
    receive a signature from the IoT device corresponding to the transaction bundle;
    verify the signature from the IoT device; and
    identify a nonce corresponding to the generated transaction bundle in response to the verification of the signature from the IoT device.

2. The controller of claim 1, the hardware processor further executes instructions to:
  perform a proof of work (PoW) computation to identify the nonce; and
  add the nonce to the transaction bundle.

3. The controller of claim 1, wherein the controller monitors the IoT device for subsequent payments from the IoT device.

4. The controller of claim 1, wherein the controller comprises the trusted list of entities.

5. The controller of claim 1, wherein the controller rejects a subsequent payment initiated by the IoT device when the IoT device initiates a transaction with a non-trusted entity.

6. The controller of claim 1, wherein the transaction bundle describes a quantity of IOTA currency.

7. The controller of claim 1, wherein the controller executes a Markov Chain Monte Carlo (MCMC) technique, in response to the verification of the signature, to identify a trunk and a branch within the transition bundle.

8. The controller of claim 7, wherein the trunk and the branch are utilized to store the transaction bundle as an immutable record in the decentralized entity.

9. The controller of claim 1, wherein the meta transaction includes a signatureMessageFragment.

10. The controller of claim 9, wherein the signatureMessageFragment includes the signature, a portion of the signature, or a message.

11. A server facilitating payments between a plurality of Internet of Things (IoT) devices, the server comprising:
  a hardware processor; and
  a memory having instructions stored thereon that when executed by the hardware processor cause the hardware processor to:
    receive information from an IoT device of the plurality of IoT devices associated with a payment, the payment involving the IoT device;
    determine whether the payment involving the IoT device is permitted based on business policies and a trusted list of entities;
    create a meta transaction including information about the IoT device of the plurality of IoT devices, in response to the determination of whether the payment is permitted, wherein the meta transaction is created in response to the IoT device generating an input transaction;
    receive an output transaction, an input transaction, and an unspent transaction from the IoT device;
    generate a transaction bundle including the output transaction, the input transaction, the unspent transaction, and the meta transaction;
    apply a hash to the transaction bundle and verify a signature from the IoT device on the hashed transaction bundle based on a signature included in the meta transaction;
    identify a nonce corresponding to the generated transaction bundle in response to the verification of the signature from the IoT device; and
    initiate a consensus of the hashed transaction bundle within a decentralized entity.

12. The server of claim 11, wherein the unspent transaction includes a leftover quantity of IOTA currency to be included in a new address for the IoT device.

13. The server of claim 11, wherein the server creates a new meta transaction for subsequent payments initiated by the plurality of IoT devices.

14. The server of claim 11, wherein the server generates a unique transaction bundle for an IoT device of the plurality of IoT devices when payments are initiated by the IoT device.

15. A non-transitory medium including instructions executable by a hardware processor to:
   monitor a plurality of internet of things (IoT) devices for payment transactions, wherein monitoring comprises determining whether the payment transactions are permitted based on a trusted list of entities to which payment transactions may be initiated by the plurality of IoT devices;
   create a meta transaction based on a payment transaction initiated by an IoT device, of the plurality of IoT devices, wherein the meta transaction is created in response to the IoT device generating an input transaction;
   receive an output transaction, an input transaction, and an unspent transaction from the IoT device;
   generate a transaction bundle including the output transaction, the input transaction, the unspent transaction, and the meta transaction;
   receive a signature from the IoT device corresponding to the transaction bundle;
   verify the signature from the IoT device; and
   identify a nonce corresponding to the generated transaction bundle in response to the verification of the signature from the IoT device.

16. The medium of claim 15, wherein the hardware processor further executes instructions to apply business policies to the plurality of IoT devices.

17. The medium of claim 16, wherein the business policies include the trusted list of entities.

* * * * *